US011796244B2

(12) United States Patent
Lv et al.

(10) Patent No.: US 11,796,244 B2
(45) Date of Patent: Oct. 24, 2023

(54) DOOR FOR REFRIGERATOR, REFRIGERATOR AND METHOD OF MANUFACTURING THE DOOR

(71) Applicants: QINGDAO HAIER REFRIGERATOR CO., LTD., Qingdao (CN); HAIER SMART HOME CO., LTD., Qingdao (CN)

(72) Inventors: Xianbing Lv, Qingdao (CN); Ning Wang, Qingdao (CN); Zhijun Liu, Qingdao (CN); Lei Liu, Qingdao (CN); Xiaobin Hu, Qingdao (CN)

(73) Assignees: QINGDAO HAIER REFRIGERATOR CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 95 days.

(21) Appl. No.: 17/616,637

(22) PCT Filed: Oct. 15, 2019

(86) PCT No.: PCT/CN2019/111179
§ 371 (c)(1),
(2) Date: Dec. 3, 2021

(87) PCT Pub. No.: WO2020/244114
PCT Pub. Date: Dec. 10, 2020

(65) Prior Publication Data
US 2022/0228797 A1 Jul. 21, 2022

(30) Foreign Application Priority Data
Jun. 6, 2019 (CN) .......................... 201910489324.9

(51) Int. Cl.
*F25D 23/02* (2006.01)

(52) U.S. Cl.
CPC ................. *F25D 23/028* (2013.01)

(58) Field of Classification Search
CPC ...... F25D 23/028; F25D 23/064; F25D 23/02; B29L 2031/7622; B29C 44/18;
(Continued)

(56) References Cited

U.S. PATENT DOCUMENTS

| 4,102,721 A | * | 7/1978 | Carey, Jr. | ................... | C09J 7/20 |
| | | | | | 249/141 |
| 4,955,675 A | * | 9/1990 | Donaghy | .............. | B29C 44/588 |
| | | | | | 312/405 |

(Continued)

FOREIGN PATENT DOCUMENTS

| CN | 101206096 A | 6/2008 |
| CN | 104949444 A | 9/2015 |

(Continued)

*Primary Examiner* — Hanh V Tran
(74) *Attorney, Agent, or Firm* — Cheng-Ju Chiang

(57) ABSTRACT

The present invention discloses a door for a refrigerator, a refrigerator and a method of manufacturing the door. The door comprises a door frame enclosed at a periphery, and a first side plate and a second side plate located on two opposed sides of the door frame, the door frame, the first side plate and the second side plate forming a receiving space for receiving a foaming material, wherein the door frame is provided with at least one material overflow preventing assembly which comprises an air discharge hole disposed on the door frame, a receiving cavity communicated with the air discharge hole, and a material discharging passage communicated with the receiving cavity, the air discharge hole is communicated with the external, and the material discharging passage is communicated with the receiving space. The present invention makes the manufacturing cost lower and the quality of products of the door higher.

10 Claims, 7 Drawing Sheets

(58) Field of Classification Search
CPC ....... B29C 33/10; B29C 44/35; B29C 44/588; B29C 44/34; B29C 44/58
See application file for complete search history.

(56) References Cited

U.S. PATENT DOCUMENTS

| | | | | |
|---|---|---|---|---|
| 5,103,528 | A * | 4/1992 | Olson | F25D 23/064 16/2.2 |
| 5,576,031 | A * | 11/1996 | Uchida | A23G 3/2015 264/246 |
| 5,740,074 | A * | 4/1998 | Wang | G06F 30/23 700/266 |
| 6,209,265 | B1 * | 4/2001 | Banicevic | F25D 23/028 49/501 |
| D517,900 | S * | 3/2006 | Goldenberg | D8/354 |
| 10,899,264 | B2 * | 1/2021 | Jung | F25D 23/06 |
| 11,085,690 | B2 * | 8/2021 | Naik | F16L 59/065 |
| 11,255,584 | B2 * | 2/2022 | Oh | F25D 23/028 |
| 2006/0265960 | A1 * | 11/2006 | Leimkuehler | F25D 23/02 49/501 |
| 2013/0175725 | A1 * | 7/2013 | Tokiwa | B29C 44/343 264/45.4 |
| 2014/0139087 | A1 * | 5/2014 | Tobbe | B29C 44/385 264/46.4 |
| 2014/0312521 | A1 * | 10/2014 | Yonezawa | B29C 44/588 425/546 |
| 2015/0174812 | A1 * | 6/2015 | Tokiwa | B29C 44/343 264/46.6 |
| 2015/0192347 | A1 * | 7/2015 | Cho | F25D 21/04 62/272 |
| 2017/0191745 | A1 * | 7/2017 | Choi | F25D 27/005 |
| 2021/0238793 | A1 * | 8/2021 | Choi | B29C 44/1214 |
| 2022/0184863 | A1 * | 6/2022 | Kangas | B29C 44/14 |

FOREIGN PATENT DOCUMENTS

| | | | |
|---|---|---|---|
| CN | 105371575 A | | 3/2016 |
| CN | 205192065 U | | 4/2016 |
| CN | 205300095 U | | 6/2016 |
| CN | 106288619 A | | 1/2017 |
| CN | 106839639 A | | 6/2017 |
| CN | 206817867 U | * | 12/2017 |
| CN | 208704274 U | | 4/2019 |
| CN | 208909735 U | * | 5/2019 |
| CN | 208909875 U | * | 5/2019 |
| CN | 217031770 U | * | 7/2022 |
| DE | 102010027918 A1 | * | 10/2011 ............ F25D 23/02 |
| EP | 0388279 A1 | | 9/1990 |
| EP | 0602373 A1 | * | 6/1994 |
| JP | S60-42526 A | | 3/1985 |
| JP | 05280690 A | * | 10/1993 ............ B29C 33/10 |

* cited by examiner

DOOR FOR REFRIGERATOR, REFRIGERATOR AND METHOD OF MANUFACTURING THE DOOR

CROSS REFERENCE TO RELATED APPLICATIONS

The present application is a 35 U.S.C. § 371 National Phase conversion of International (PCT) Patent Application No. PCT/CN2019/111179, filed on Oct. 15, 2019, which claims priorities of a Chinese Patent Application No. 201910489324.9, filed on Jun. 6, 2019, the disclosure of which is incorporated by reference herein. The PCT International Patent Application was filed and published in Chinese.

TECHNICAL FIELD

The present invention relates to the field of household appliance and in particular to a door for a refrigerator, a refrigerator and a method of manufacturing the door.

BACKGROUND

Usually, a foaming material of a door is polyurethane, and a foaming process is divided into 3 stages: a cream time stage, a gelation stage, and a curing stage. In addition, after foaming, air inside the door needs to be discharged. For example, the Chinese utility model patent CN205300095U as granted and announced on Jun. 8, 2016 discloses a door for a refrigerating device, comprising a door front panel and a door liner opposed to each other, and door end covers between the door front panel and the door liner, wherein a cavity for injecting the foaming material is formed between the door front panel, the door liner and the door end covers; a material-injecting hole is disposed on one of the door end covers opposed to each other, and an air discharge hole adapted for inserting an air discharge pipe is disposed on the other of the door end covers; during air discharge, the foaming material in the gelation state will be discharged through the air discharge hole out of the door end covers and needs to be manually cleaned. As such, not only the man power is wasted and the manufacturing cost is increased, but also the foaming material cannot be cleaned thoroughly, thereby affecting the quality of the products of the door.

SUMMARY

An object of the present invention is to provide a door for a refrigerator, a refrigerator and a method of manufacturing the door, which makes the manufacturing cost lower and the quality of products of the door higher.

To achieve one of the above objects of the present invention, an embodiment of the present invention provides a door for a refrigerator. the door comprising a door frame enclosed at a periphery, and a first side plate and a second side plate located on two opposed sides of the door frame, the door frame, the first side plate and the second side plate forming a receiving space for receiving a foaming material, wherein the door frame is provided with at least one material overflow preventing assembly which comprises an air discharge hole disposed on the door frame, a receiving cavity communicated with the air discharge hole, and a material discharging passage communicated with the receiving cavity, the air discharge hole is communicated with the external, and the material discharging passage is communicated with the receiving space.

As a further improvement of an embodiment of the present invention, wherein the air discharge hole extends along an extension axis, a plane perpendicular to the extension axis is defined as a first plane, a projection area of the receiving cavity on the first plane is greater than a projection area of the air discharge hole on the first plane, and the projection area of the receiving cavity on the first plane is greater than the projection area of the material discharging passage on the first plane.

As a further improvement of an embodiment of the present invention, wherein each material overflow preventing assembly comprises a plurality of air discharge holes, and projections of the plurality of air discharge holes on the first plane are all located in a range of the projection of the receiving cavity on the first plane.

As a further improvement of an embodiment of the present invention, wherein the projection of the material discharging passage on the first plane is located out of the range of the projection of the receiving cavity on the first plane.

As a further improvement of an embodiment of the present invention, wherein the material overflow preventing assembly comprises a protrusion formed on the door frame and forming the receiving cavity, and a cap disposed at an outer circumference of the protrusion and covering the receiving cavity, and wherein the protrusion extends from the door frame inward the receiving cavity, and the material discharging passage is defined between the protrusion and the cap.

As a further improvement of an embodiment of the present invention, wherein the material discharging passage comprises a longitudinal through slot disposed on the outer circumference of the protrusion and extending in an extension direction of the protrusion, the longitudinal through slot is communicated with the receiving space, and remaining outer circumference of the protrusion except for the longitudinal through slot abuts against an inner side of the cap.

As a further improvement of an embodiment of the present invention, wherein a plurality of longitudinal through slots are provided and evenly distributed on the outer circumference of the protrusion.

As a further improvement of an embodiment of the present invention, wherein the cap comprises an edge portion abutting against the door frame and a bottom portion opposed to the edge portion, the material discharging passage further comprises a groove disposed on the door frame and communicated with the longitudinal through slot, and an extension direction of the groove is perpendicular to the extension direction of the longitudinal through slot.

As a further improvement of an embodiment of the present invention, wherein the door frame comprises an upper molding strip, a lower molding strip opposed to the upper molding strip, a left side rim and a right side rim opposed to the left side rim, the left side rim and right side rim are connected to the upper molding strip and lower molding strip, and the material overflow preventing assembly is disposed on the upper molding strip and/or lower molding strip.

As a further improvement of an embodiment of the present invention, wherein the air discharge hole comprises a conical hole portion communicated with the receiving cavity and a round hole portion connected with the conical hole portion, the round hole portion being connected with the external.

To achieve one of the above objects of the present invention, another embodiment of the present invention further provides a refrigerator, comprising a cabinet defining a storage space, and a door connected to the cabinet to open or close at least part of the storage space, wherein the door is set as the door according to the above technical solution.

To achieve one of the above objects of the present invention, a further embodiment of the present invention further provides a method of manufacturing a door for a refrigerator, wherein the method comprises:

providing a door frame enclosed at a periphery;
providing a first side plate attached to a side of the door frame;
injecting a foaming material into a receiving space formed by the door frame and the first side plate;
providing a second side plate attached to the other side of the door frame to enclose the receiving space;
the door frame is provided with at least one material overflow preventing assembly which comprises an air discharge hole disposed on the door frame, a receiving cavity communicated with the air discharge hole, and a material discharging passage communicated with the receiving cavity; the air discharge hole is communicated with the external, and the material discharging passage is communicated with the receiving space; after the foaming material flows into the receiving cavity through the material discharging passage, the foaming material is in a gelation state upon passing through the material discharging passage and gets cured upon reaching the interior of the receiving cavity, and air in the receiving space is discharged out through the air discharge hole after foaming.

As compared with the prior art, the present invention has the following advantageous effects: with the technical solutions being employed, the material overflow preventing assembly comprises the receiving cavity communicated with the air discharge hole, and the material discharging passage communicated with the receiving cavity, the air discharge hole is communicated with the external, and the material discharging passage is communicated with the receiving space. Therefore, the foaming material is in a gelation state upon passing through the material discharging passage, and gathers in the receiving cavity after passing through the material discharging passage. When the foaming material advances forward into the receiving cavity under a pressure, the foaming material will transition from the gelation state to a cured state and the foaming fluidity is very poor, so the foaming material will not overflow through the air discharge hoe out of the door frame, and the air in the receiving space after foaming will be discharged through the air discharge hole. To sum up, no foaming material outside the door frame need be manually cleaned additionally, thereby substantially reducing the manufacturing cost and improving the quality of products.

DETAILED DESCRIPTION

The present invention will be described in detail below in conjunction with specific embodiments shown in the figures. However, these embodiments are not intended to limit the present invention. Variations in structures, methods or functions made by those having ordinary skill in the art according to these embodiments are all comprised in the extent of protection of the present invention.

In the depictions of the specific embodiments of the present invention, directional or positional relationship as indicted by terms such as "up", "down", "front", "rear", "left", "right", "vertical", "horizontal", "bottom", "in" and "out" is based on the directional or positional relationship shown in the figures usually with reference to the normal in-use state of the refrigerator, and does not indicate that the designated position or element must be in a specific direction.

Moreover, it should be appreciated that although the terms such as "first" and "second" may be used to describe various elements or structures herein, the described objects should not be limited by the above terms. The above terms are only used to distinguish the described objects from each other. For example, a first side plate may also be referred to as a second side plate, and also the second side plate may also be referred to as the first side plate, which does not depart from the extent of protection of the present invention.

Figure 1:
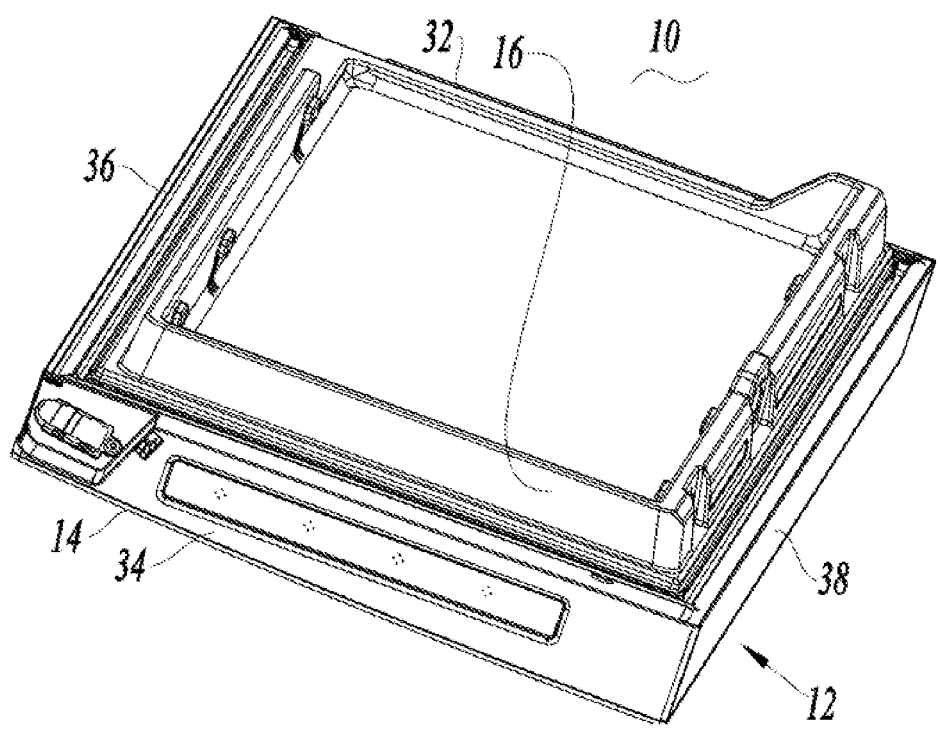
FIG. 1 is a perspective view of a door for a refrigerator in a specific embodiment of the present invention.
Figure 2:
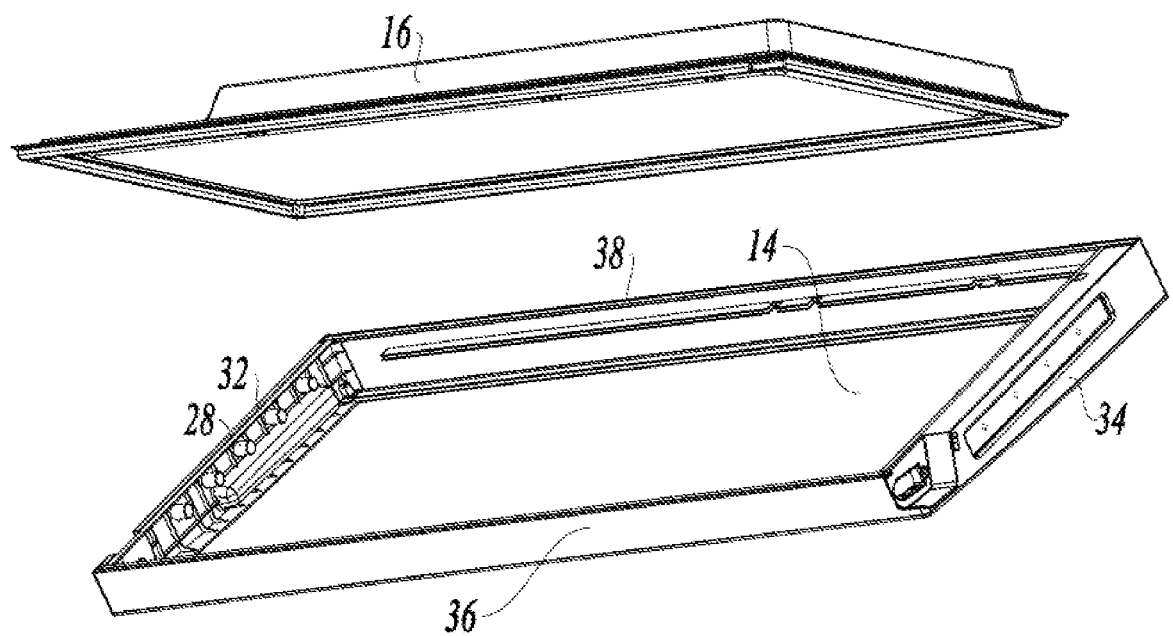
FIG. 2 is a partially exploded view of the door of FIG. 1.
Figure 3:
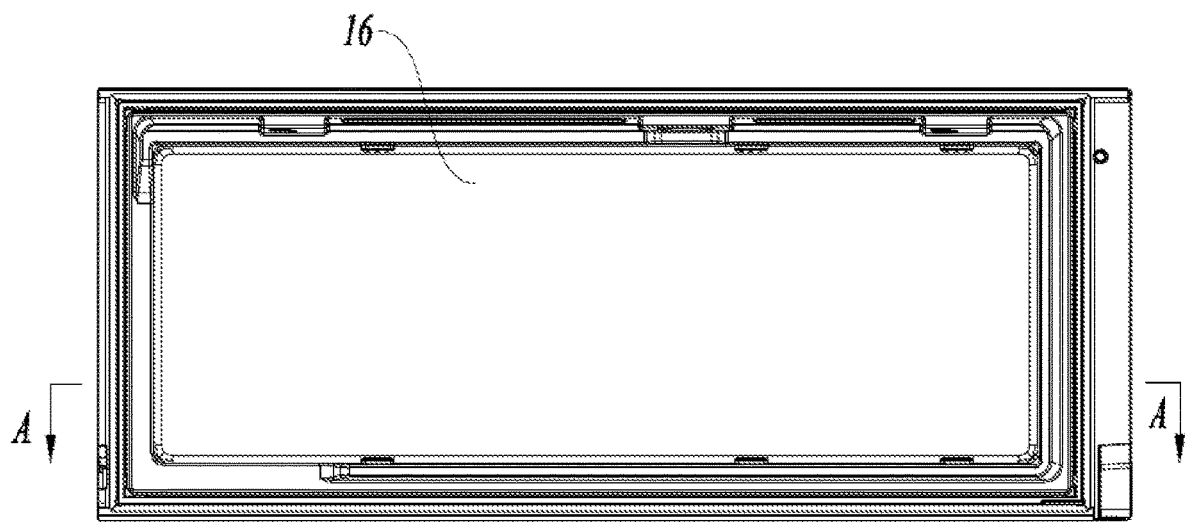
FIG. 3 is a front view of the door of FIG. 1.
Figure 4:
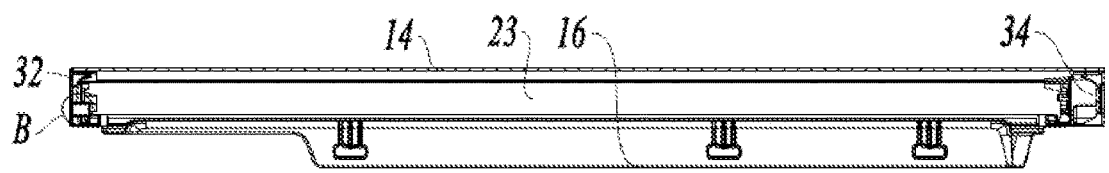
FIG. 4 is a cross-sectional view taken along line A-A of FIG. 3.
Figure 5:
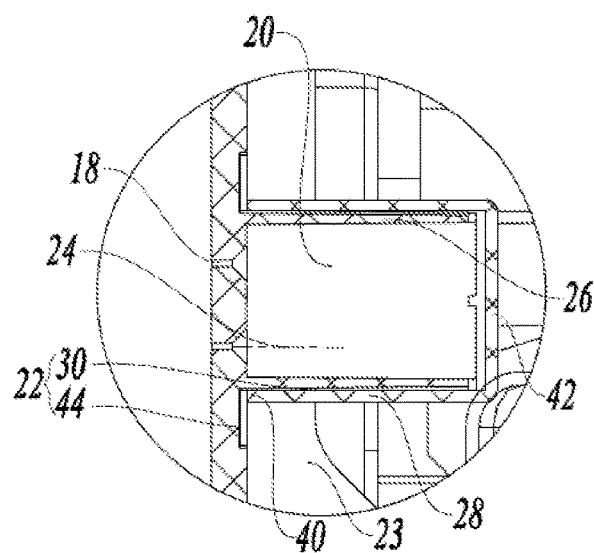
FIG. 5 is a partially enlarged view of position B of FIG. 4.
Figure 6:
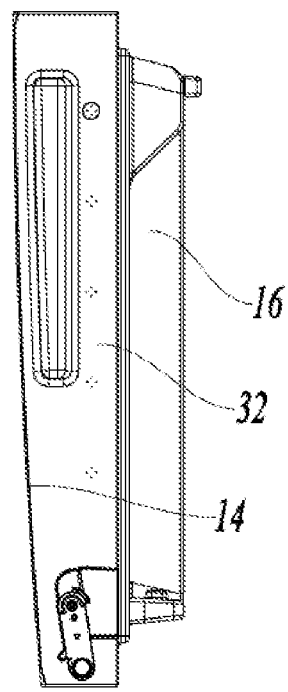
FIG. 6 is an enlarged left view of the door of FIG. 3.
Figure 7:
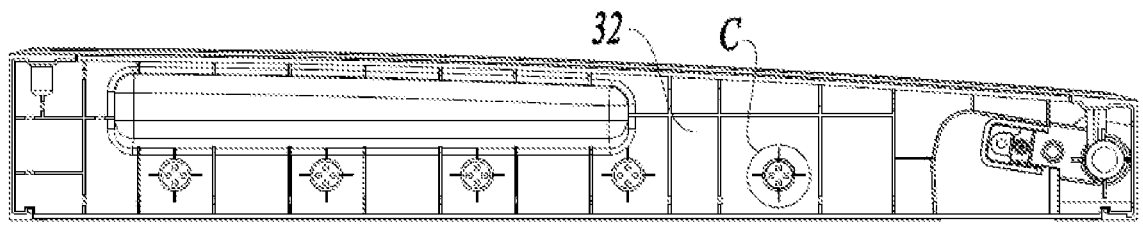
FIG. 7 is a perspective view of an upper molding strip of the door of FIG. 1, whereupon a cap is removed.
Figure 8:
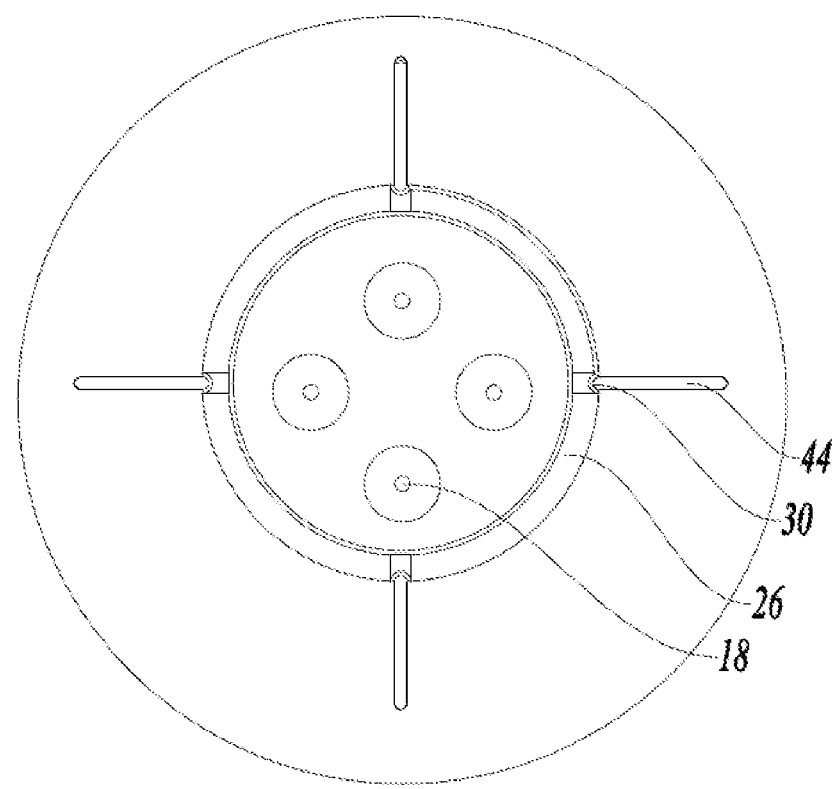
FIG. 8 is a partially enlarged view of positon C of FIG. 7.
Figure 9:
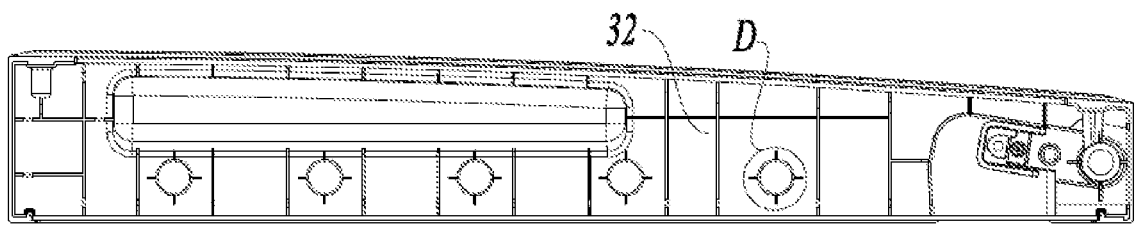
FIG. 9 is a perspective view of an upper molding strip of FIG. 7, whereupon the cap is mounted.
Figure 10:
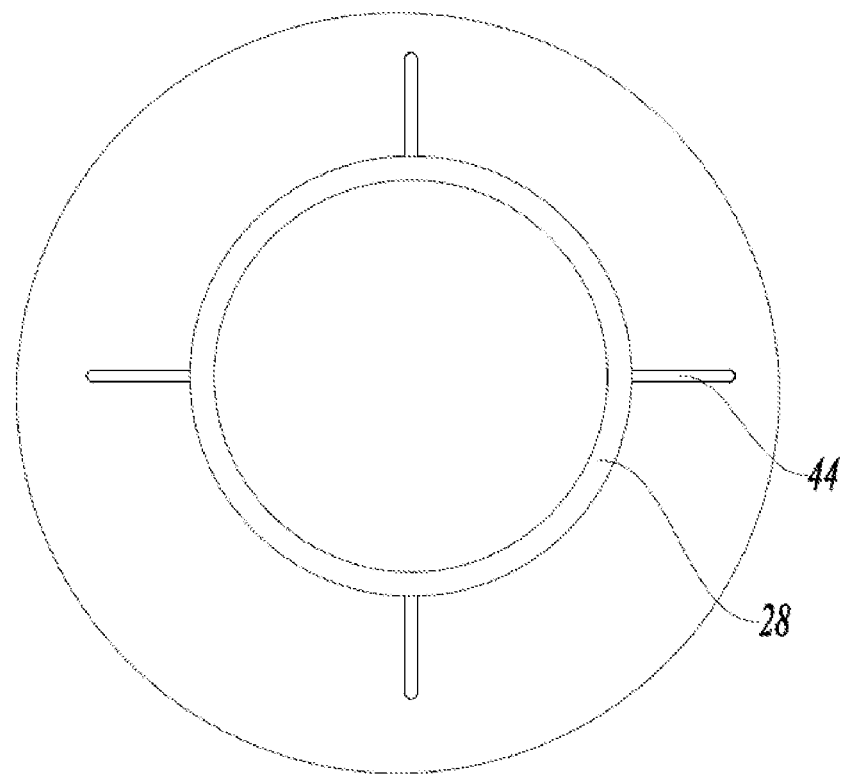
FIG. 10 is a partially enlarged view of positon D of FIG. 9.
Figure 11:
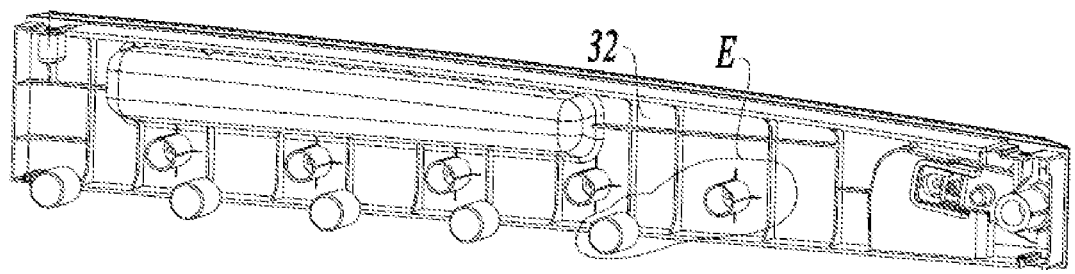
FIG. 11 is an exploded perspective view of the upper molding strip of FIG. 7.
Figure 12:
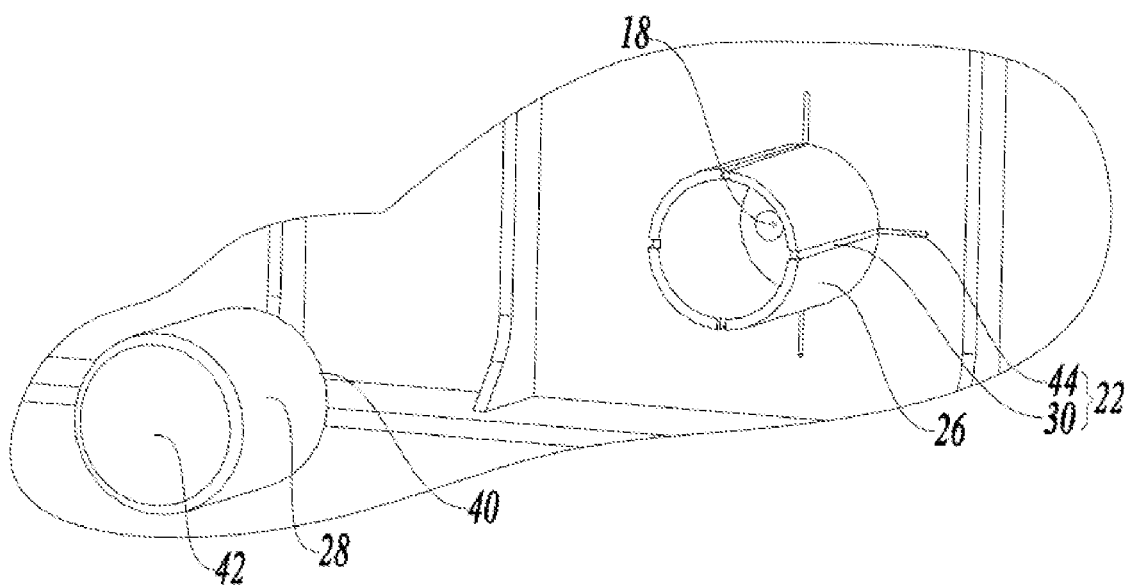
FIG. 12 is a partially enlarged view of positon E of FIG. 11.

As shown in FIG. 1, an embodiment of the present invention provides a refrigerator comprising a cabinet (not shown) and a door 10 connected to the cabinet, wherein the cabinet defines a storage space, and the door 10 is operable to open or close at least part of the storage space. The storage space may comprise a plurality of storage components whose number and structural forms may be configured according to different needs. The storage components usually comprise a refrigerating chamber and a freezing chamber.

Further referring to FIG. 1 through FIG. 5, the door 10 comprises a door frame 12 enclosed at the periphery, and a first side plate 14 and a second side plate 16 located on two opposed sides of the door frame 12, the door frame 12, the first side plate 14 and the second side plate 16 forming a receiving space 23 for receiving a foaming material. The door frame 12 is provided with at least one material overflow preventing assembly which comprises an air discharge hole 18 disposed on the door frame 12, a receiving cavity 20 communicated with the air discharge hole 18, and a material discharging passage 22 communicated with the receiving cavity 20, the air discharge hole 18 is communicated with the external, and the material discharging passage 22 is communicated with the receiving space 23.

In the present preferred embodiment, the material overflow preventing assembly comprises the receiving cavity 20 communicated with the air discharge hole 18, and the material discharging passage 22 communicated with the receiving cavity 20, the air discharge hole 18 is communicated with the external, and the material discharging passage 22 is communicated with the receiving space 23. Therefore, the foaming material is in a gelation state upon passing through the material discharging passage 22, and gathers in the receiving cavity 20 after passing through the material discharging passage 22. When the foaming material advances forward into the receiving cavity 20 under a pressure, the foaming material will transition from the gelation state to a cured state and the foaming fluidity is very poor, so the foaming material will not overflow through the air discharge hole 18 out of the door frame 12, and the air in the receiving space 23 after foaming will be discharged through the air discharge hole 18. As such, no foaming material outside the door frame 12 need be manually cleaned additionally, thereby substantially reducing the manufacturing cost and improving the quality of products.

Specifically, the air discharge hole 18 extends along an extension axis 24, a plane perpendicular to the extension axis 24 is defined as a first plane, a projection area of the receiving cavity 20 on the first plane is greater than a projection area of the air discharge hole 18 on the first plane, and the projection area of the receiving cavity 20 on the first plane is greater than the projection area of the material discharging passage 22 on the first plane. It is further ensured that the foaming material reaches a cured state after passing through the narrow material discharging passage 22, and then entering the wide receiving cavity 20 under a certain pressure, thereby gathering in the receiving cavity 20 and preventing the overflow of the foaming material.

Further referring to FIG. 6 through FIG. 12, each material overflow preventing assembly comprises a plurality of air discharge holes 18, and projections of the plurality of air discharge holes 18 on the first plane are all located in a range of the projection of the receiving cavity 20 on the first plane. In the present preferred embodiment, four air discharge holes 18 are provided, the four air discharge holes 18 are uniformly distributed in the receiving cavity 20, and the four air discharge holes 18 are all set the same so that they can be processed and manufactured conveniently. Certainly, the air discharge holes 18 may be set in another number, and the air discharge holes 18 may also set partially the same and partially different. It is also possible to set all the air discharge holes 18 different from one another.

Furthermore, the projection of the material discharging passage 22 on the first plane is located out of the range of the projection of the receiving cavity 20 on the first plane. One, two or more material overflow preventing assemblies may also be provided.

Specifically, the material overflow preventing assembly comprises a protrusion 26 formed on the door frame 12 and forming the receiving cavity 20, and a cap 28 disposed at the outer circumference of the protrusion 26 and covering the receiving cavity 20; the protrusion 26 extends from the door frame 12 inward the receiving cavity 23, and the material discharging passage 22 is defined between the protrusion 26 and the cap 28.

In the present embodiment, the material discharging passage 22 comprises a longitudinal through slot 30 disposed on the outer circumference of the protrusion 26 and extending in an extension direction of the protrusion 26, the longitudinal through slot 30 is communicated with the receiving space 23, and remaining outer circumference of the protrusion 26 except for the longitudinal through slot 30 abuts against the inner side of the cap 28. Such an arrangement makes the structure simple and easy to manufacture. A plurality of longitudinal through slots 30 are provided and evenly distributed on the outer circumference of the protrusion 26. Certainly, the plurality of longitudinal through slots 30 may not be evenly distributed on the outer circumference of the protrusion 26. In the present embodiment, four longitudinal through slots 30 are provided, and may also be set in another number. The protrusion 26 is set in a cylindrical shape, and certainly may also be set in another shape. The four longitudinal through slots 30 are evenly distributed on the outer circumference of the protrusion 26. Certainly, the four longitudinal through slots 30 may also be set to be arranged unevenly. In addition, the four longitudinal through slots 30 are set to be the same so that they can be processed and manufactured conveniently. Likewise, the four longitudinal through slots 30 may also be set partially the same and partially different. Certainly, the four longitudinal through slots 30 may also be set different from one another.

In addition, the material discharging passage 22 may also be set in other structural forms in addition to the longitudinal through slot 30, so long as a passage is formed between the protrusion 26 and the cap 28 to communicate the receiving space 23 with the receiving cavity 20. For example, the longitudinal through slot 30 is not disposed on the outer circumference of the protrusion 26, and a certain gap is ensured between the outer circumference of the protrusion 26 and the cap 28 to form the material discharging passage 22 to allow the foaming material and air to pass therethrough.

Referring to FIG. 1, the door frame 12 comprises an upper molding strip 32, a lower molding strip 34 opposed to the upper molding strip 32, a left side rim 36 and a right side rim 38 opposed to the left side rim 36, the left side rim 36 and right side rim 38 are connected to the upper molding strip 32 and lower molding strip 34, and the material overflow preventing assembly is disposed on the upper molding strip 32 and/or lower molding strip 34. In the present embodiment, both the upper molding strip 32 and lower molding strip 34 are provided with the material overflow preventing assembly. The material overflow preventing assemblies on the upper molding strip 32 and lower molding strip 34 may be set to be symmetrical with each other. Certainly, the material overflow preventing assemblies on the upper molding strip 32 and lower molding strip 34 may also be set asymmetrical. In addition, the structural forms of the material overflow preventing assemblies on the upper molding strip 32 and lower molding strip 34 may be set completely the same. Likewise, the structural forms of the material overflow preventing assemblies on the upper molding strip 32 and lower molding strip 34 may also be set not completely the same.

The air discharge hole 18 comprises a conical hole portion communicated with the receiving cavity 20 and a round hole portion connected with the conical hole portion, the round hole portion being connected with the external. Such an arrangement enables a better air-discharging performance and better prevents the overflow of the material.

Furthermore, the cap 28 comprises an edge portion 40 abutting against the door frame 12 and a bottom portion 42 opposed to the edge portion 40, the bottom portion 42 is used to enclose the receiving cavity 20, the material discharging passage 22 further comprises a groove 44 disposed on the door frame 12 and communicated with the longitudinal through slot 30, and an extension direction of the groove 44 is perpendicular to the extension direction of the longitudinal through slot 30. Each longitudinal through slot 30 is communicated with the groove 44 so that the foaming material and air enter the longitudinal through slot 30 through the groove 44 and then enter the receiving cavity 20.

The present invention further provides a method of manufacturing a door 10 for a refrigerator, wherein the method comprises:

providing a door frame 12 enclosed at a periphery;

providing a first side plate 14 attached to a side of the door frame 12;

injecting a foaming material into a receiving space 23 formed by the door frame 12 and the first side plate 14;

providing a second side plate 16 attached to the other side of the door frame 12 to enclose the receiving space 23;

the door frame 12 is provided with at least one material overflow preventing assembly which comprises an air discharge hole 18 disposed on the door frame 12, a receiving cavity 20 communicated with the air discharge hole 18, and a material discharging passage 22 communicated with the receiving cavity 20, wherein the air discharge hole 18 is communicated with the external, and the material discharging passage 22 is communicated with the receiving space 23. After the foaming material flows into the receiving cavity 20 through the material discharging passage 22, the foaming material is in a gelation state upon passing through the material discharging passage 22 and gets cured upon reaching the interior of the receiving cavity 20, and air in the receiving space 23 is discharged out through the air discharge hole 18 after foaming.

In the present preferred embodiment, the first side plate 14 is a front panel forming the front of the door 10, and the second side plate 16 is a door liner forming the rear of the door 10. Certainly, the first side plate 14 may also set as the door liner forming the rear of the door 10, and correspondingly, the second side plate 16 is set as the front panel forming the front of the door 10. In the manufacturing process, a mold is used to attach the first side plate 14 to the door frame 12, then the foaming material is injected, then the mold is used to mount the second side plate 16, and finally the foaming material foams and expands. Partial foaming material enters the receiving cavity 20 as air is pushed and pressed, and gets cured in the receiving cavity 20, and air is discharged out through the air discharge port 18, thereby preventing the overflow of the foaming material so that no foaming material need be manually cleaned, reducing the processing and manufacturing cost, making the door 10 pleasant in appearance and improving the quality of products.

It should be understood that although the description is described according to the embodiments, not every embodiment only comprises one independent technical solution, that such a description manner is only for the sake of clarity, that those skilled in the art should take the description as an integral part, and that the technical solutions in the embodiments may be suitably combined to form other embodiments understandable by those skilled in the art.

The detailed descriptions set forth above are merely specific illustrations of feasible embodiments of the present invention, and are not intended to limit the scope of protection of the present invention. All equivalent embodiments or modifications that do not depart from the art spirit of the present invention should fall within the scope of protection of the present invention.

What is claimed is:

1. A door for a refrigerator, the door comprising a door frame enclosed at a periphery of the door, and a first side plate and a second side plate located on two opposed sides of the door frame, the door frame, the first side plate and the second side plate forming a receiving space for receiving a foaming material; wherein the door frame is provided with at least one material overflow preventing assembly which comprises an air discharge hole disposed on the door frame, a hollow protrusion formed on the door frame to extend in the receiving space, a receiving cavity formed in the protrusion to extend in the receiving space from the door frame and communicated with the air discharge hole, a cap disposed at an outer circumference of the protrusion and enclosing the receiving cavity between the door frame having the air discharge hole and the cap, and a material discharging passage communicated with the receiving cavity, the air discharge hole is communicated with an external, and the material discharging passage is communicated with the receiving space and is defined between the protrusion and the cap;

the air discharge hole extends along an extension axis, a plane perpendicular to the extension axis is defined as a first plane, a projection area of the receiving cavity on the first plane is greater than a projection area of the air discharge hole on the first plane, and the projection area of the receiving cavity on the first plane is greater than the projection area of the material discharging passage on the first plane;

the receiving space is connected to the external sequentially through the material discharging passage, the receiving cavity and the air discharge hole.

2. The door according to claim 1, wherein each material overflow preventing assembly comprises a plurality of air discharge holes, and projections of the plurality of air discharge holes on the first plane are all located in a range of the projection of the receiving cavity on the first plane.

3. The door according to claim 1, wherein the projection of the material discharging passage on the first plane is located out of the range of the projection of the receiving cavity on the first plane.

4. The door according to claim 1, wherein the material discharging passage comprises a longitudinal through slot disposed on the outer circumference of the protrusion and extending in an extension direction of the protrusion, the longitudinal through slot is communicated with the receiving space, and remaining outer circumference of the protrusion except for the longitudinal through slot abuts against an inner side of the cap.

5. The door according to claim 4, wherein a plurality of longitudinal through slots are provided and evenly distributed on the outer circumference of the protrusion.

6. The door according to claim 4, wherein the cap comprises an edge portion abutting against the door frame and a bottom portion opposed to the edge portion, the material discharging passage further comprises a groove disposed on the door frame and communicated with the longitudinal through slot, and an extension direction of the groove is perpendicular to the extension direction of the longitudinal through slot.

7. The door according to claim 1, wherein the door frame comprises an upper molding strip, a lower molding strip opposed to the upper molding strip, a left side rim and a right side rim opposed to the left side rim, the left side rim and right side rim are connected to the upper molding strip and lower molding strip, and the material overflow preventing assembly is disposed on the upper molding strip and/or lower molding strip.

8. The door according to claim 1, wherein the air discharge hole comprises a conical hole portion communicated with the receiving cavity and a round hole portion connected with the conical hole portion, the round hole portion being connected with the external.

9. A refrigerator, comprising a cabinet defining a storage space, and a door connected to the cabinet to open or close at least part of the storage space, wherein the door is set as the door according to claim 1.

10. A method of manufacturing a door for a refrigerator, wherein the method comprises:

provide a door frame enclosed at a periphery of the door;

providing a first side plate attached to a side of the door frame;

injecting a foaming material into a receiving space formed by the door frame and the first side plate;

providing a second side plate attached to the other side of the door frame to enclose the receiving space; wherein the door frame is provided with at least one material overflow preventing assembly which comprises an air discharge hole disposed on the door frame, a hollow protrusion formed on the door frame to extend in the receiving space, a receiving cavity formed in the protrusion to extend in the receiving space from the door frame and communicated with the air discharge hole, a cap disposed at an outer circumference of the protrusion and enclosing the receiving cavity between the door frame having the air discharge hole and the cap, and a material discharging passage communicated with the receiving cavity; the air discharge hole is communicated with an external, and the material discharging passage is communicated with the receiving space and is defined between the protrusion and the cap;

the air discharge hole extends along an extension axis, a plane perpendicular to the extension axis is defined as a first plane, a projection area of the receiving cavity on the first plane is greater than a projection area of the air discharge hole on the first plane, and the projection area of the receiving cavity on the first plane is greater than the projection area of the material discharging passage on the first plane;

after the foaming material flows into the receiving cavity through the material discharging passage, the foaming material is in a gelation state upon passing through the material discharging passage and gets cured upon reaching the interior of the receiving cavity, and air in the receiving space is discharged out through the air discharge hole after foaming.

\* \* \* \* \*